US012265344B2

(12) United States Patent
Katagiri et al.

(10) Patent No.: US 12,265,344 B2
(45) Date of Patent: Apr. 1, 2025

(54) IMAGE FORMING APPARATUS TO SUPPRESS SCATTERING OF TONER

(71) Applicant: CANON KABUSHIKI KAISHA, Tokyo (JP)

(72) Inventors: Hiroko Katagiri, Tokyo (JP); Shinji Katagiri, Kanagawa (JP); Koji An, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/507,546

(22) Filed: Nov. 13, 2023

(65) Prior Publication Data

US 2024/0085827 A1 Mar. 14, 2024

Related U.S. Application Data

(63) Continuation of application No. 17/930,632, filed on Sep. 8, 2022, now Pat. No. 11,841,649.

(30) Foreign Application Priority Data

Sep. 8, 2021 (JP) ................................ 2021-146409

(51) Int. Cl.
*G03G 15/16* (2006.01)
*G03G 15/00* (2006.01)

(52) U.S. Cl.
CPC ......... *G03G 15/1615* (2013.01); *G03G 15/80* (2013.01)

(58) Field of Classification Search
USPC ...................................................... 399/66, 88
See application file for complete search history.

(56) References Cited

U.S. PATENT DOCUMENTS

2018/0181051 A1* 6/2018 Yoshida ............... G03G 15/161

* cited by examiner

*Primary Examiner* — Quana Grainger
(74) *Attorney, Agent, or Firm* — Canon U.S.A., Inc. I.P. Division

(57) ABSTRACT

In an image forming apparatus including a transfer member that primarily transfers a developer image from an image bearing member onto an intermediate transfer belt by applying an electric current to an intermediate transfer belt in a circumferential direction, a control unit which executes a first mode in which to rotate the intermediate transfer belt and a second mode in which to rotate the intermediate transfer belt at a rotation speed higher than that in the first mode. The control unit performs control such that an absolute value of a second voltage to be applied to the transfer member in a case of performing primary transfer in the second mode is less than an absolute value of a first voltage to be applied to the transfer member in a case of performing the primary transfer in the first mode.

7 Claims, 9 Drawing Sheets

FIG.4

| | HH ENVIRONMENT | NN ENVIRONMENT | LL ENVIRONMENT |
|---|---|---|---|
| VOLUME RESISTIVITY (Ω·cm) | $2.5 \times 10^{9}$ | $1 \times 10^{10}$ | $5 \times 10^{10}$ |

FIG.5

| | HH ENVIRONMENT | NN ENVIRONMENT | LL ENVIRONMENT |
|---|---|---|---|
| CHARGE AMOUNT OF TONER (μC/g) | 25 | 35 | 40 |

FIG.7

| | WATER CONTENT (g/m³) \ TEMPERATURE (°C) | | L 15 | L 16 | N 22 | N 23 | H 30 | H 31 |
|---|---|---|---|---|---|---|---|---|
| L | 1 | V1 | 350 | 348 | 320 | 318 | 296 | 294 |
| | | V2 | 347 | 345 | 314 | 312 | 290 | 288 |
| | 2 | V1 | 348 | 346 | 318 | 316 | 294 | 292 |
| | | V2 | 345 | 343 | 312 | 310 | 288 | 286 |
| N | 9 | V1 | 334 | 332 | 304 | 302 | 280 | 278 |
| | | V2 | 328 | 326 | 296 | 294 | 274 | 272 |
| | 10 | V1 | 332 | 330 | 302 | 300 | 278 | 276 |
| | | V2 | 326 | 324 | 294 | 292 | 272 | 270 |
| H | 24 | V1 | 306 | 304 | 274 | 272 | 250 | 248 |
| | | V2 | 300 | 298 | 268 | 266 | 247 | 245 |
| | 25 | V1 | 304 | 302 | 272 | 270 | 248 | 246 |
| | | V2 | 298 | 296 | 266 | 264 | 245 | 243 |

(V)

IMAGE FORMING APPARATUS TO SUPPRESS SCATTERING OF TONER

CROSS-REFERENCE TO RELATED APPLICATIONS

The present application is a continuation of U.S. patent application Ser. No. 17/930,632, filed on Sep. 8, 2022, which claims priority from Japanese Patent Application No. 2021-146409 filed Sep. 8, 2021, which are hereby incorporated by reference herein in their entireties.

BACKGROUND

Field of the Disclosure

The present disclosure relates to an image forming apparatus such as an electrophotographic copier or printer.

Description of the Related Art

There have been conventionally known image forming apparatuses such as copiers and laser printers that perform image formation using an electrophotographic process.

Such an image forming apparatus, in a transfer process, electrostatically transfers a toner image formed on the surface of a photosensitive drum onto an intermediate transfer body or recording medium by applying a voltage to a transfer member arranged at a part (primary transfer part) facing the photosensitive drum (primary transfer). The image forming apparatus repeats the transfer process for toner images of a plurality of colors to form the toner images in the plurality of colors on the intermediate transfer body or the recording medium.

With regard to the transfer process, Japanese Patent Application Laid-Open No. 2006-259639 discusses a configuration of an image forming apparatus in which primary transfer is performed by passing electric current through an endless intermediate transfer belt, serving as an intermediate transfer body, in a circumferential direction that is the movement direction of the intermediate transfer belt.

According to the configuration described in Japanese Patent Application Laid-Open No. 2006-259639, however, if the primary transfer voltage is raised at the time of passing electric current through the intermediate transfer belt in the circumferential direction, the electric field may become strong upstream of the primary transfer part. In this case, an image defect may occur such that (immediately) before the entry of toner on the photosensitive drum into the primary transfer part, the toner may fly outside of a predetermined image area on the intermediate transfer belt.

SUMMARY

One embodiment of the present disclosure provides an image forming apparatus configured to perform primary transfer by applying electric current to an intermediate transfer belt in a circumferential direction that can effectively suppress scattering of toner in a plurality of modes in which the rotation speed of the intermediate transfer belt varies from low to high speeds.

According to an aspect of the present disclosure, an image forming apparatus includes an image bearing member configured to bear a developer image, a rotatable endless intermediate transfer belt, a transfer member configured to transfer the developer image from the image bearing member onto the intermediate transfer belt by applying an electric current to the intermediate transfer belt in a circumferential direction, a power source configured to apply a voltage to the transfer member, and a control unit controlling at least the power source, wherein the control unit executes a first mode in which to rotate the intermediate transfer belt and a second mode in which to rotate the intermediate transfer belt at a rotation speed higher than that in the first mode, and wherein the control unit performs control such that an absolute value of a second voltage to be applied from the power source to the transfer member in a case of performing the primary transfer in the second mode is less than an absolute value of a first voltage to be applied from the power source to the transfer member in a case of performing the primary transfer in the first mode.

Further features of the present disclosure will become apparent from the following description of exemplary embodiments with reference to the attached drawings.

BRIEF DESCRIPTION OF THE DRAWINGS

FIG. 4 is a table indicating the volume resistivity of an intermediate transfer belt in each environment of an image forming apparatus according to a second exemplary embodiment of the present disclosure.

FIG. 5 is a table indicating the charge amount of toner in each environment of the image forming apparatus according to the second exemplary embodiment of the present disclosure.

FIG. 7 is a table of primary transfer voltage (V) in a low-speed mode and normal mode of the image forming apparatus according to the second exemplary embodiment of the present disclosure.

DESCRIPTION OF THE EMBODIMENTS

Hereinafter, exemplary embodiments of the present disclosure will be described with reference to the drawings. However, dimensions, materials, shapes, and relative arrangement of components described in relation to the following exemplary embodiments should be changed as appropriate depending on the configuration and various conditions of the apparatus to which the present disclosure is applied. Therefore, unless otherwise specified, these factors are not intended to limit the scope of the present disclosure to the following exemplary embodiments.

Figure 1:
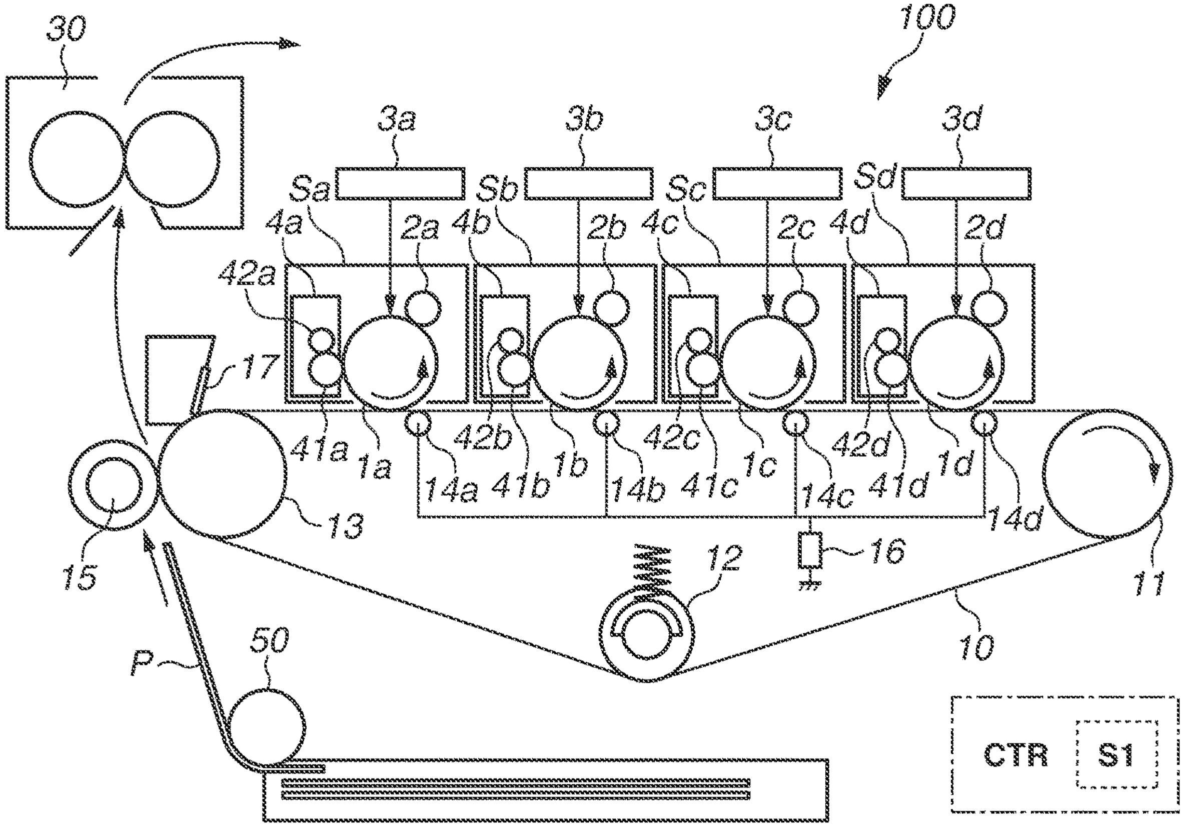
FIG. 1 is a conceptual cross-sectional view of an image forming apparatus according to a first exemplary embodiment of the present disclosure.

FIG. 1 is a conceptual cross-sectional view of an image forming apparatus according to a first exemplary embodiment of the present disclosure.

Specifically, FIG. 1 illustrates an example of a color image forming apparatus 100. A configuration and operations of the image forming apparatus 100 will be described with reference to FIG. 1.

As illustrated in FIG. 1, the image forming apparatus 100 is a tandem-type printer provided with four image formation stations Sa to Sd. Specifically, the first image formation station Sa forms an image in yellow (Y), the second image formation station Sb forms an image in magenta (M), the third image formation station Sc forms an image in cyan (C), and the fourth image formation station Sd forms an image in black (Bk). The image formation stations are configured in the same manner except for the color of toner stored. Thus, the first image formation station Sa will be described below as a representative.

The first image formation station Sa includes a drum-like electrophotographic photoconductor (image bearing member, hereinafter called photosensitive drum) 1*a*, a charging roller 2*a* which is a charging unit, an exposure unit 3*a*, and a development unit 4*a*. In the following description, the longitudinal direction or longitudinal width of components of the image forming apparatus refers to a direction parallel to a rotation axis of the photosensitive drum 1*a* or a dimension along the direction.

The photosensitive drum 1*a* is an image bearing member that is rotationally driven at a speed of 180 mm/sec in the direction of an arrow illustrated in FIG. 1 to bear a toner image. The photosensitive drum 1*a* has a photosensitive layer and a surface layer on a raw pipe of aluminum with a diameter φ of 20 mm. The surface layer is a thin-film layer of a thickness of 20 μm formed of polycarbonate.

In the present exemplary embodiment, the image forming apparatus 100 has a control unit CTR such as a controller that performs control related to an image forming operation.

The control unit CTR starts an image forming operation upon receipt of an image signal so that the photosensitive drum 1*a* is rotationally driven. In the course of rotation, the photosensitive drum 1*a* is uniformly charged at a predetermined potential by the charging roller 2*a* in a predetermined polarity (the negative polarity in the present exemplary embodiment). The photosensitive drum 1*a* is then light-exposed by the exposure unit 3*a* in accordance with the image signal. This forms an electrostatic latent image corresponding to a yellow component of a desired color image.

Then, the electrostatic latent image is developed by the development unit (yellow development unit) 4*a* at the development position and visualized as a yellow toner image.

The charging roller 2*a* is in abutment with the surface of the photosensitive drum 1*a* under a predetermined pressing force, and rotates following the rotation of the photosensitive drum 1*a* due to friction with the surface of the photosensitive drum 1*a*. The charging roller 2*a* has a rotation shaft to which a predetermined direct-current voltage from a charging bias power source (not illustrated) is applied in accordance with an image forming operation. In the present exemplary embodiment, the charging roller 2*a* is formed by providing an elastic layer made of a conductive elastic body with a thickness of 1.5 mm and a volume resistivity of approximately $1\times10^6$ Ωcm on a metallic shaft with a diameter of 5.5 mm.

In accordance with an image forming operation, a direct-current voltage of −1300 V is applied as a charging bias to the rotation shaft of the charging roller 2*a* to charge the surface of the photosensitive drum 1*a* at −600 V, which is a predetermined potential. The surface potential of the photosensitive drum 1*a* was measured by the surface electrometer Model344 manufactured by Trek Inc. The surface potential (−600 V) of the photosensitive drum 1*a* at this time is the surface potential of the photosensitive drum 1*a* at non-image formation time, and thus the toner image is not developed.

The exposure unit 3*a* includes a laser driver, a laser diode, a polygon mirror, an optical lens system, and the like. The exposure unit 3*a* irradiates the photosensitive drum with laser light based on image information input from a host computer (not illustrated). Accordingly, an electrostatic latent image is formed on the uniformly charged surface of the photosensitive drum 1*a*. In the present exemplary embodiment, the amount of exposure is adjusted such that an image forming potential V1 of the photosensitive drum 1*a* becomes −100 V at the latent image part after light-exposure by the exposure unit 3*a*.

The development unit 4*a* is a development unit that includes a development roller 41*a* as a development member (toner bearing member) and non-magnetic one-component toner (hereinafter, called toner) as a developer and develops an electrostatic latent image as a toner image (exerts a development action on the photosensitive drum 1*a*).

The toner is non-magnetic toner that is produced by a suspension polymerization method and has a property of being negatively charged (its normal charging polarity is negative). The toner has a volume average particle diameter of 7.0 μm and is negatively charged when being borne on the development roller 41*a*. The volume average particle diameter of the toner was measured by the laser-diffraction particle size distribution measurement device LS-230 manufactured by Beckman Coulter, Inc.

The development unit 4*a* and the image forming apparatus body include a mechanism that controls the state of abutment/separation (development separation) between the development roller 41*a* and the photosensitive drum 1*a* (not illustrated) and brings the development roller 41*a* and the photosensitive drum 1*a* into abutment with or separation from each other, in accordance with an image forming operation or the like. When the development roller 41*a* and the photosensitive drum 1*a* are in abutment with each other, the development roller 41*a* is under a pressing force of 200 gf.

The abutment portion (hereinafter, called a development nip portion) between the development roller 41*a* and the photosensitive drum 1*a* has a width of 2 mm along the rotation direction of the photosensitive drum 1*a* and has a width of 234 mm along the longitudinal direction of the photosensitive drum 1*a*. The development roller 41*a* is rotationally driven at the development nip portion in the same direction as the surficial movement direction of the photosensitive drum 1*a* (their contact surfaces move in the same direction) such that the surficial moving speed (hereinafter, circumferential velocity) is 140% of the circumferential speed of the photosensitive drum 1*a*.

The development roller 41*a* is a roller in which an elastic layer made of a urethane resin is provided on the circumference of a metal core. When the development roller 41*a* and the photosensitive drum 1*a* are in abutment with each other during an image forming operation, a −300-V direct-current voltage is applied as a development bias from a development bias power source (not illustrated) to the metal core of the development roller 41*a*. At the time of image formation, the toner borne on the development roller 41*a* is developed at the portion of the photosensitive drum 1*a* at an image forming potential V1, by an electrostatic force generated due to the difference between the image forming potential (−300 V) of the development bias and the image forming potential V1 (−100 V) of the photosensitive drum 1*a*.

A supply roller 42*a* is a sponge roller that has a porous elastic layer on the circumference of a metal core. The supply roller 42*a* is rotationally driven at a portion in contact with the development roller 41*a* in a direction counter to the development roller 41*a* (in which their contact surfaces move in the opposite directions). Accordingly, the supply roller 42*a* scrapes the coating toner off the development roller 41*a* and collects the toner into a developer container and supplies new toner onto the development roller 41*a*. The supply amount of toner is controlled by applying a predetermined direct-current voltage (supply roller voltage Vrs) to the supply roller 42*a* to control the difference in potential (supply roller contrast ΔVrs=Vrs−Vdc) from the voltage applied to the development roller 41*a* (development roller voltage Vdc).

A development blade (not illustrated) is in abutment with the development roller 41*a* so as to be oriented in a direction counter to the development roller 41*a* (upstream in the rotation direction of the development roller), thereby to regulate the coating amount of the toner and provide electric charge to the toner by friction.

An intermediate transfer belt 10 is electrically conductive, stretched by a plurality of stretching members (a drive roller 11, tension roller 12, and opposing roller 13), and rotationally driven to move in the circumferential direction at a portion opposed to and in abutment with the photosensitive drum 1*a*.

At the time of primary transfer during an image forming operation, a direct-current voltage is applied from a primary transfer power source 16 to a primary transfer roller 14*a* (also referred to as a primary transfer member 14). The toner image borne on the photosensitive drum 1*a* is primarily transferred onto the intermediate transfer belt 10 by an electric field formed by the difference between the voltage applied from the primary transfer power source 16 to the primary transfer roller 14*a* and the image forming potential V1 of the photosensitive drum 1*a* (hereinafter, primary transfer contrast). As a transfer member, the primary transfer roller 14*a* constitutes a voltage application member in the present disclosure together with the primary transfer power source 16. In the present exemplary embodiment, as illustrated in FIG. 1, a voltage is applied from the common primary transfer power source 16 to the four primary transfer rollers 14*a* to 14*d*. However, the present disclosure is not limited to this configuration. Separate primary transfer power sources may be provided to the primary transfer rollers 14, or a common primary transfer power source may apply a voltage to only some of the primary transfer rollers 14.

The yellow toner image formed on the photosensitive drum 1*a* is electrostatically transferred onto the intermediate transfer belt 10 in the course of passage through the abutment portion (hereinafter, called primary transfer portion) between the photosensitive drum 1*a* and the primary transfer roller 14*a* with the intermediate transfer belt 10 in between (primary transfer). The primary transfer in the present exemplary embodiment is performed by applying a voltage opposite in polarity to the normal charging polarity of the toner (also called primary transfer voltage), from the primary transfer power source 16 to the primary transfer roller 14*a*. The primary transfer voltage is set in accordance with the results of detection by a temperature sensor (not illustrated) and a humidity sensor (not illustrated) that are attached to the apparatus body and constitute a portion of the information acquisition part S1 of the present disclosure, in accordance with environments (temperature and humidity).

The primary transfer member 14*a* is a metallic cylindrical roller with a diameter φ of 6 mm and is made of nickel-plated SUS as a material. The primary transfer member 14*a* is arranged at a position offset 8 mm downstream from the central position on the photosensitive drum 1*a* in the movement direction of the intermediate transfer belt 10, and is wound around the photosensitive drum 1*a*. The primary transfer member 14*a* is arranged at a position lifted 1 mm from a horizontal plane formed by the photosensitive drum 1*a* and the intermediate transfer belt 10 to secure the amount of winding of the intermediate transfer belt 10 around the photosensitive drum 1*a*, and presses the intermediate transfer belt 10 by a force of approximately 200 gf.

The primary transfer member 14*a* rotates following the rotation of the intermediate transfer belt 10. The primary transfer member 14*b* arranged in the second image formation station Sb, the primary transfer member 14*c* arranged in the third image formation station Sc, and the primary transfer member 14*d* arranged in the fourth image formation station Sd are configured similarly to the primary transfer member 14*a*.

Similarly, a toner image in magenta as a second color, a toner image in cyan as a third color, and a toner image in black as a fourth color are formed by the second, third, and fourth image formation stations Sb, Sc, and Sd. Then, the toner images are transferred and overlapped in sequence on the intermediate transfer belt 10 to obtain a composite color image corresponding to the desired color image.

The toner images in the four colors on the intermediate transfer belt 10 are collectively transferred onto the surface of a recording material P supplied by a supply unit 50 (secondary transfer), in the course of passage through a secondary transfer nip formed by the intermediate transfer belt 10 and a secondary transfer roller 15. The secondary transfer roller 15 as a secondary transfer member is in abutment with the intermediate transfer belt 10 under a pressing force of 50N to form a secondary transfer part (hereinafter, secondary transfer nip). The secondary transfer roller 15 rotates following the rotation of the intermediate transfer belt 10. When the toner on the intermediate transfer belt 10 is secondarily transferred onto the recording material P such as paper, a secondary transfer voltage of 1500 V is applied from a secondary transfer power source (not illustrated) to the secondary transfer roller 15.

After that, the recording material P bearing the toner images in the four colors is introduced into a fixing unit 30 and heated and pressurized there, whereby the toner in the four colors is melted and mixed, and fixed (fused) to the recording material P.

The recording material P may be paper of a desired type (for example, plain paper, gloss paper, or the like) and of a desired size. The plain paper here refers to, for example, a recording material with a basis weight in a range of 60 ($g/m^2$) to 90 ($g/m^2$). The gloss paper refers to a recording material that is larger in basis weight and thickness than the plain paper.

The gloss paper is thicker and larger in heat capacity than the plain paper, and thus requires greater heat quantity than the plain paper in the fixing process.

In the present exemplary embodiment, in the case of using the gloss paper as the recording material P, the process speed in the primary transfer process, the secondary transfer process, and the fixing process is slowed to 60 mm/sec that is ⅓ of that with the plain paper, thereby to secure the heat quantity to be applied to the gloss paper.

A cleaning device 17 has a cleaning blade or the like that comes into abutment with the outer peripheral surface of the intermediate transfer belt 10 to scrape the remaining toner from the intermediate transfer belt 10 and collect the scraped toner into the intermediate transfer belt cleaning device 17. The intermediate transfer belt cleaning device 17 is arranged to collect the toner from the intermediate transfer belt 10 (from the intermediate transfer body) downstream of the secondary transfer part in the intermediate transfer belt 10 in the rotation direction of the intermediate transfer belt 10.

By the operation described above, a full-color printed image is formed.

Next, the intermediate transfer belt 10 will be described in detail.

Figure 2:
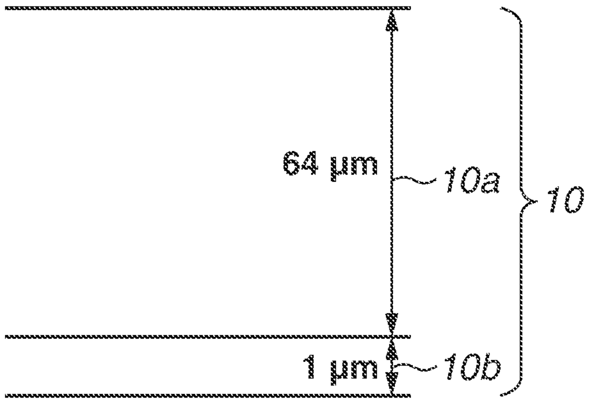
FIG. 2 is a conceptual cross-sectional view of an intermediate transfer belt in the image forming apparatus according to the first exemplary embodiment of the present disclosure.

FIG. 2 is a conceptual cross-sectional view of the intermediate transfer belt in the image forming apparatus according to the first exemplary embodiment of the present disclosure.

The intermediate transfer belt 10 used in the present exemplary embodiment is an endless type with a circumferential length of 700 mm and a thickness of 65 μm. As illustrated in FIG. 2, the intermediate transfer belt 10 includes two layers, a base layer 10*a* with a thickness of 64 μm and an inner layer 10*b* with a thickness of 1 μm. The base layer 10*a* (on the outer peripheral surface side) is in abutment with the photosensitive drums 1, and the inner layer 10*b* (on the inner peripheral surface side) is in abutment with the primary transfer members 14.

The base layer 10*a* is made of a polyethylene terephthalate (PET) resin mixed with an ion-conductive agent as a conductive material. The inner layer 10*b* is made of a polyester resin mixed with carbon, formed inside the base layer 10*a*, and in contact with a drive roller 11, a tension roller 12, and an opposing roller 13 (a roller which is opposing to the secondary transfer roller 15). In the present exemplary embodiment, the base layer 10*a* is made of polyethylene terephthalate (PET) resin, but may be made of another material selected as appropriate.

For example, the base layer 10*a* may be made of a material such as polyester or acrylonitrile-butadiene-styrene copolymer (ABS) or a mixture of these resins. In the present exemplary embodiment, the inner layer 10*b* is made of a polyester resin, but may be made of another resin, such as an acrylic resin, for example.

In the present exemplary embodiment, the inner layer 10*b* is lower in resistance than the base layer 10*a* in the intermediate transfer belt 10. The volume resistivity of the intermediate transfer belt 10 used in the present exemplary embodiment is $1\times10^{10}$ Ωcm. The surface resistance of inner surface of the intermediate transfer belt 10 is $1.0\times10^{6}$Ω/□.

In the present exemplary embodiment, in the measurement environment, the indoor temperature is 23° C., and the indoor humidity is 50% (hereinafter, also called NN environment).

From the relationship in resistance and thickness between the base layer 10*a* and the inner layer 10*b*, the actually measured volume resistivity of the intermediate transfer belt 10 reflects the resistance value of the base layer 10*a*. On the other hand, the actually measured surface resistivity of inner surface of the intermediate transfer belt 10 reflects the resistance value of the inner layer 10*b*.

The volume resistivity was measured by a ring-probe type UR (model code MCP-HTP12) used in Hiresta-UP (MCP-HT450) manufactured by Mitsubishi Chemical Corporation.

The surface resistivity was measured by a ring-probe type UR100 (model code MCP-HTP16) used in the same measurement instrument as that for measuring the volume resistivity.

The volume resistivity was measured by applying the probe to the surface side of the intermediate transfer belt 10 under an applied voltage of 100 V and for a measurement time of 10 seconds.

The surface resistivity was measured by applying the probe to the inner side of the intermediate transfer belt 10 under an applied voltage of 10 V and for a measurement time of 10 seconds.

In the present exemplary embodiment, the volume resistivity of the intermediate transfer belt 10 is preferably within a range of $1\times10^{9}$ to $1\times10^{10}$ Ωcm, and the surface resistivity of inner surface of the intermediate transfer belt 10 is preferably $4.0\times10^{6}$Ω/□ or less.

Next, a toner scattering phenomenon around the primary transfer part will be described.

Toner scattering occurs when toner flying from the photosensitive drum onto the intermediate transfer belt 10 in the primary transfer process bounces on the belt or toner particles collide with each other and fly off beside the image (outside a predetermined image area).

Upstream of the primary transfer part, if a phenomenon called "pre-transfer," which is flying of the toner on the photosensitive drum toward the intermediate transfer belt 10, occurs before reaching the primary transfer nip, due to an electric field between the photosensitive drum and the intermediate transfer belt 10, the toner will scatter prominently. In particular, at a position where a pre-transfer occurs, the toner flies a longer distance and moves more heavily than at a normal primary transfer position, and thus toner scattering is likely to be more prominent.

Further, the intermediate transfer belt 10 in the present exemplary embodiment is low in resistance to a degree that electric current can be passed in the intermediate transfer belt 10 in the circumferential direction. In this configuration, if the primary transfer voltage is set to be high, a pre-transfer will be likely to occur due to an increase in strength of the electric field upstream of the primary transfer nip.

In the case of feeding the plain paper as the recording material P, the process speed is three times higher than that in the case of feeding the gloss paper. Thus, the kinetic energy of the flying toner becomes large under the influence of an air flow generated by acceleration of the process speed, toner scattering is prone to be more prominent.

In the present exemplary embodiment, in order to suppress toner scattering from being prominent in a high-speed process mode (M2), the primary transfer voltage is set to be lower than that in a low-speed process mode (M1), thereby effectively suppressing the occurrence of a pre-transfer.

As described below, from the viewpoint of transferability, separately from the viewpoint of suppressing toner scattering, in the case of decreasing the primary transfer voltage, a necessary transfer electric field is maintained at the primary transfer nip.

That is, the primary transfer voltage is more desirably determined by taking into consideration both toner scattering and transferability at each process speed.

Control of Primary Transfer Voltage

Next, a control method of the primary transfer voltage in the present exemplary embodiment will be described.

In the present exemplary embodiment, both the suppression of toner scattering and the attainment of transferability are satisfied by decreasing the primary transfer voltage in the second mode M2 in which the plain paper (thin paper) is fed (hereinafter, also called normal mode) so as to be lower than that in the first mode M1 in which the gloss paper (thick paper) is fed (hereinafter, also called low-speed mode). In other words, the control unit CTR has the first mode M1 and the second mode M2, and can perform processing with a selection of different process speed modes depending on the paper type (that is, the process speed corresponding to the paper type).

As described above, in the normal mode M2 higher in the process speed, toner scattering may be more prominent than in the low-speed mode M1, and thus the primary transfer voltage is preferably lowered to a degree that transferability is not deteriorated.

Figure 3:
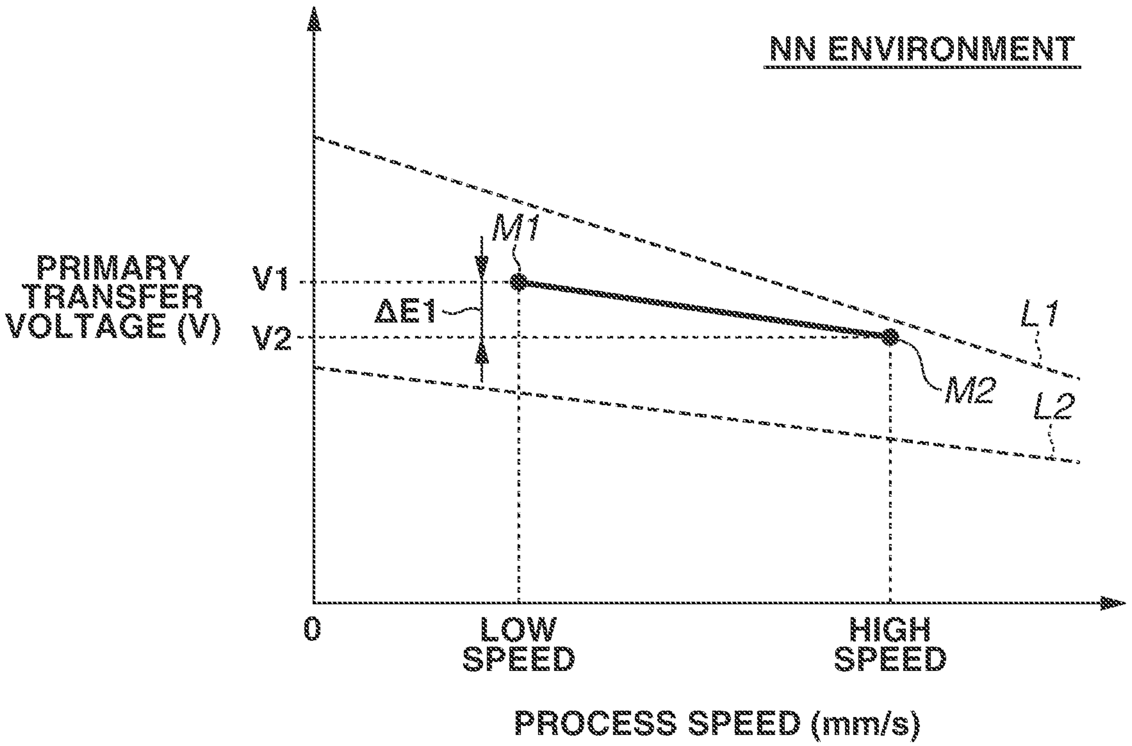
FIG. 3 is a conceptual diagram illustrating a relationship between process speed and primary transfer voltage in a normal environment (at a temperature of 23° C. and a humidity of 50%) in the image forming apparatus according to the first exemplary embodiment of the present disclosure.

FIG. 3 is a conceptual diagram illustrating a relationship between process speed and primary transfer voltage in the normal environment NN (at a temperature of 23° C. and a humidity of 50%).

FIG. 3 illustrates an example of preferable ranges of process speed and primary transfer voltage in terms of toner scattering and transferability in the environment NN of the present exemplary embodiment.

Specifically, as illustrated in FIG. 3, at a high process speed (in the mode M2), the primary transfer voltage is lower than that at a low process speed (in the mode M1) in terms of absolute values. The upper limit of the range of primary transfer voltage in which toner scattering (for example, indicated by a dotted line L1) is preferably suppressed may be set to be lower at the high-speed side (in the mode M2) than at the low-speed side (in the mode M1).

Considering the case of using a high-density image in the low-speed mode (M1), the lower limit of the range of primary transfer voltage with preferred transferability (for example, indicated by a dotted line L2) may be set to be higher on the low-speed side (in the mode M1) than on the high-speed side (in the mode M2).

That is, as illustrated in FIG. 3, the primary transfer voltage can be determined within a region in which the preferred range of transferability (for example, the region above the dotted line L2) and the preferred range of toner scattering suppression (for example, the region under the dotted line L1) overlap each other.

In the present exemplary embodiment, the primary transfer voltage V1 (first voltage) is set to 300 V in the low-speed mode M1, and the primary transfer voltage V2 (second voltage) is set to 292 V in the normal mode M2, so that the primary transfer voltage in the normal mode is lowered by a reduction amount of 8 V (a difference in absolute value) relative to the primary transfer voltage in the low-speed mode.

That is, in the present exemplary embodiment, the primary transfer voltage in the low-speed mode M1 (first mode) is lower than that in the normal mode M2 (second mode) (V1>V2) in terms of absolute value, and the absolute value of a difference (reduction amount) ΔE1 in voltage (=V1−V2) is 8 V.

The primary transfer voltage in the low-speed mode M1 may be made the same as the primary transfer voltage in the normal mode M2. However, in the low-speed mode M1, high-density image formation with the gloss paper or the like (for example, photograph printing) is performed in many cases, and thus the primary transfer voltage is desirably made higher than that in the normal mode M2, with a margin for transferability.

As a condition for forming a high-density image in the low-speed mode M1, for example, image information input from a host computer (not illustrated) may be converted into cyan, magenta, yellow, and black (CMYK) data using a color table (conversion table) with a larger amount of data than that in the normal mode M2. Alternatively, a high-density image may be output with an increased amount of toner to be developed in the low-speed mode M1 by setting the circumferential velocity ratio of the photosensitive drums 1 and the development rollers 41 so as to be higher than that in the normal mode M2.

Evaluations

Next, verification methods and evaluations of toner scattering and transferability will be described.

For verification of toner scattering, first, two-dot images of black toner are taken and captured by OneshotVR3000 manufactured by Keyence Corporation, with a magnification 80 times setting in a high-magnification mode. From the captured image, the scattering levels of toner can be evaluated and ranked in descending order of A, B, and C, for example.

For example, as illustrated in FIG. 3, the process speed and the primary transfer voltage are measured with regard to various preset reference values. In the drawing, the part in which the scattering level of toner is in the highest rank A is indicated with the dotted line L1 in the drawing. The dotted line L1 can be set as the upper limit of the allowable range of toner scattering. That is, within the range (for example, the region under the dotted line L1), toner scattering can be reduced more effectively to form higher-quality images.

On the other hand, a favorable range of transferability can be set, for example, through verification of occurrence status of an image defect due to residual toner on the photosensitive drum without being used for primary transfer (non-transferred toner). Specifically, the image defect due to the non-transferred toner refers to an image defect (cleaner-less ghost) in which the non-transferred toner not collected by the development roller at the time of passage through the development roller is transferred by the transfer part and made visible as an image after making one round along with the rotation of the photosensitive drum.

Evaluation images used are a patch image of 190% image data (yellow: 95%, magenta: 95%) in the normal mode M2 and a patch image of 200% image data (yellow: 100%, magenta: 100%) in the low-speed mode M1.

For example, as illustrated in FIG. 3, the process speed and the primary transfer voltage are measured with appropriate settings. In the drawing, the part in which no occurrence of a cleaner-less ghost is observed in the entire image area is illustrated by the dotted line L2. The dotted line L2 may be the lower limit of the preferable range of transferability. That is, in this range (for example, the region above the dotted line L2), higher transferability can be achieved to form higher-quality images.

As above, decreasing the primary transfer voltage in the normal mode M2 to be lower than that in the low-speed mode M1 effectively suppresses toner scattering.

In addition, setting the primary voltage in consideration of transferability effectively suppresses toner scattering and achieves high transferability.

In the present exemplary embodiment, the primary transfer contrast is changed by changing the primary transfer voltage. However, the present disclosure is not limited to this. The primary transfer contrast may be changed by changing the image forming potential V1, not changing the primary transfer voltage. Alternatively, the primary transfer contrast may be changed by changing both the primary transfer voltage and the image forming potential V1.

In the present exemplary embodiment, the intermediate transfer belt 10 is configured to perform primary transfer with the use of the inner layer lower in resistance than the base layer on the inner side of the base layer to pass electric current from the primary transfer rollers 14 as the transfer members to the intermediate transfer belt 10 in the circumferential direction. On the other hand, the inner layer may not be provided as far as electric current can be passed through the intermediate transfer belt 10 in the circumferential direction to perform primary transfer. For example, an inner layer may be used if its circumferential electric resistance corresponding to a circumferential length of 100 mm of the intermediate transfer belt 10 is $1\times10^{9}\Omega$ or less.

An image forming apparatus in a second exemplary embodiment is basically similar to that in the first exemplary embodiment, and thus differences will be described below.

In the present exemplary embodiment, environmental information is further taken into account in setting a primary transfer voltage allowing for suppression of toner scattering.

Specifically, the present exemplary embodiment is different from the first exemplary embodiment in that a reduction amount ΔE (difference) of primary transfer voltage in a normal mode M2 relative to a low-speed mode M1 is changed in accordance with results of detection by environment (temperature and humidity) sensors (information acquisition unit S1).

In the present disclosure, the inventor's earnest study has revealed that the level of toner scattering may vary depending on the environment (temperature and humidity). According to the present exemplary embodiment, it is possible to more optimally set the primary transfer voltage in each environment by changing the reduction amount ΔE of the primary transfer voltage in each environment.

Next, the relationship between toner scattering and environment (temperature and humidity) will be described.

Parameters affecting toner scattering depending on the environment (temperature and humidity) include the resistance of an intermediate transfer belt 10 and the charge amount of toner.

Toner scattering improves more with lower energy of flying toner with which a pre-transfer is unlikely to occur. Accordingly, it is considered that toner scattering is unlikely to occur as the resistance of the intermediate transfer belt is higher and the charge amount of the toner is smaller.

FIG. 4 is a table indicating the volume resistivity of the intermediate transfer belt 10 in each environment in the image forming apparatus according to the second exemplary embodiment of the present disclosure. A method for measuring the volume resistivity is the same as the method described in relation to the first exemplary embodiment.

As illustrated in FIG. 4, in a high-temperature and high-humidity environment at a temperature of 30° C. and a humidity of 80% (hereinafter, also called HH environment) as an example, the volume resistivity is lower than that in the NN environment. On the other hand, in a low-temperature and low-humidity environment at a temperature of 15° C. and a humidity of 10% (hereinafter, also called LL environment) as an example, the volume resistivity was higher than that in the NN environment.

This is because an ion conductive agent is mixed as a conductive material into the intermediate transfer belt 10, and ions moves as carriers to exert conductivity. In the intermediate transfer belt 10 imparted with conductivity by the ion conductive agent, the movement of the ions becomes sluggish making the resistance high with increasing proximity to the LL environment at a low temperature and a low humidity.

Accordingly, from the viewpoint of belt resistance, it is considered that toner scattering is unlikely to occur in the LL environment in which the volume resistivity of the intermediate transfer belt 10 is high.

FIG. 5 is a table indicating the charge amount of toner in each environment of the image forming apparatus according to the second exemplary embodiment of the present disclosure.

As illustrated in FIG. 5, the charge amount of toner varies depending on the use environment (temperature and humidity). The charge amount is smaller in the HH environment than in the NN environment, and the charge amount is larger in the LL environment than in the NN environment.

This is because the toner is likely to absorb moisture and becomes lower in resistance in the HH environment, whereas the toner is unlikely to absorb moisture and the capability of holding the charge amount in the LL environment enhances. Thus, from the viewpoint of the charge amount of toner, it is considered that toner scattering is unlikely to occur in the HH environment in which the charge amount is small.

Figure 6A:
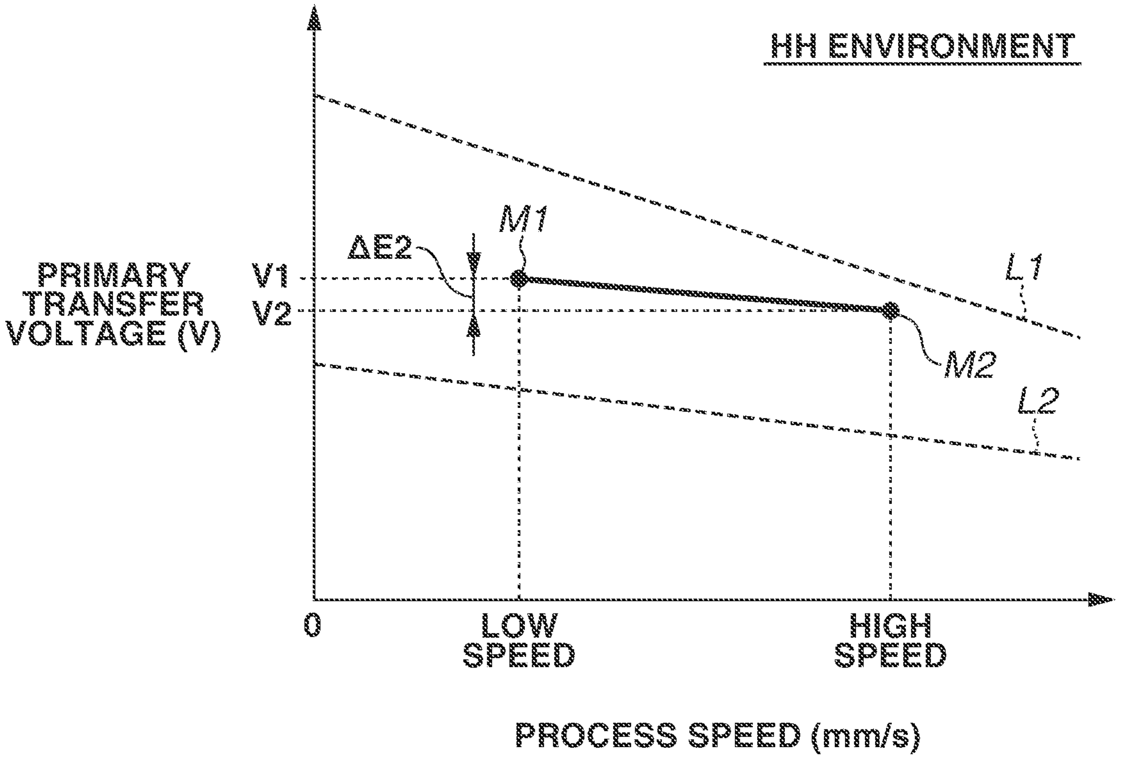
FIG. 6A is a conceptual diagram illustrating a relationship between process speed and primary transfer voltage in a high-temperature and high-humidity environment.
Figure 6B:
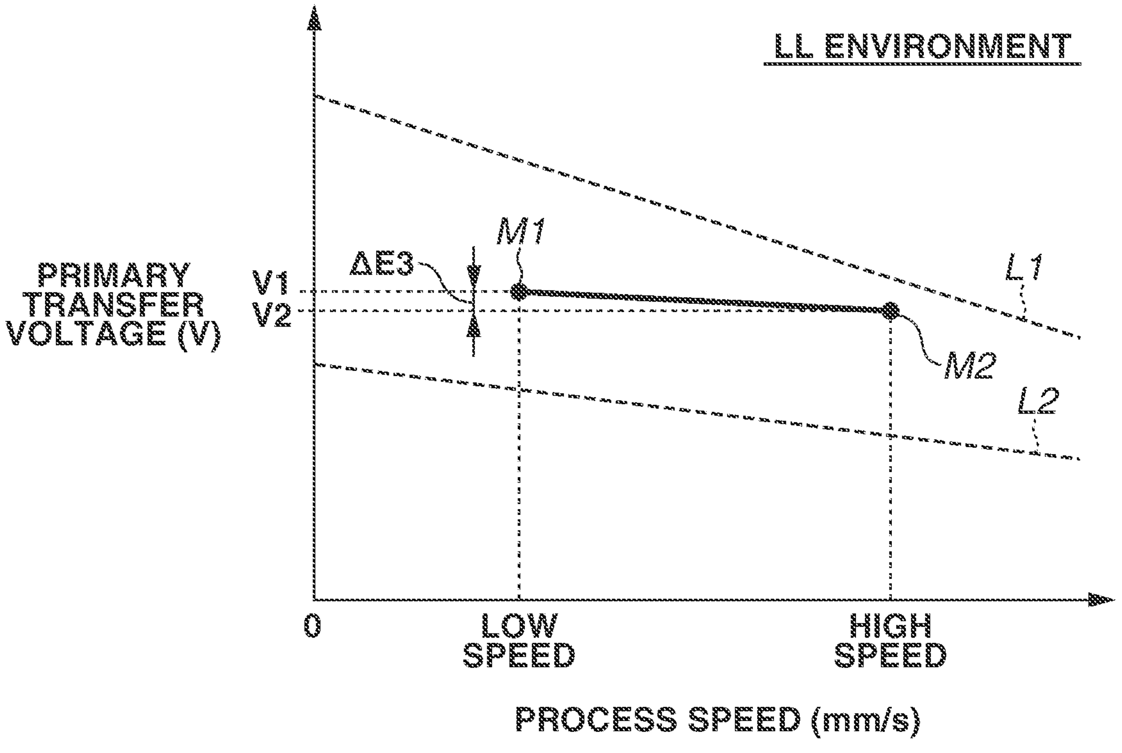
FIG. 6B is a conceptual diagram illustrating a relationship between process speed and primary transfer voltage in a low-temperature and low-humidity environment, of the image forming apparatus according to the second exemplary embodiment of the present disclosure.

FIG. 6A is a conceptual diagram illustrating a relationship between process speed and primary transfer voltage in the high-temperature and high-humidity environment HH and FIG. 6B is a conceptual diagram illustrating a relationship between process speed and primary transfer voltage in the low-temperature and low-humidity environment LL, of the image forming apparatus according to the second exemplary embodiment of the present disclosure.

As illustrated in FIG. 6, in the HH environment and the LL environment, toner scattering tends to be improved with decrease in the primary transfer voltage, as in the NN environment described in relation to the first exemplary embodiment.

On the other hand, unlike the NN environment, in the HH environment and the LL environment, a preferable range of toner scattering (dotted line L1) is shifted to the high-voltage side relative to the preferable range of transferability (dotted line L2) as compared to in the NN environment.

This is because in the HH environment, the decrease in the level of toner scattering due to variation in the charge amount of the toner is larger than the increase in the level of toner scattering due to variation in the belt resistance, and in the LL environment, the increase in the level of toner scattering due to variation in the belt resistance is larger than the increase in the level of toner scattering due to variation in the charge amount of the toner.

Accordingly, in the HH environment and the LL environment, the reduction amount (ΔE2, ΔE3) of the primary transfer voltage from the low-speed mode M1 to the normal mode M2 can be made smaller than the reduction amount (ΔE1) in the NN environment (ΔE2≤ΔE1, ΔE3≤ΔE1).

In the present exemplary embodiment, in the HH environment and the LL environment, the reduction amount ΔE2, ΔE3 of the primary transfer voltage from the low-speed mode M1 to the normal mode M2 is set to 3 V, and in the NN environment, the reduction amount ΔE1 of the primary transfer voltage from the low-speed mode M1 to the normal mode M2 is set to 8 V as in the first exemplary embodiment.

In this manner, it is possible to provide a margin in transferability in the normal mode in the HH environment in which the temperature and humidity are higher than those in the NN environment, in which toner scattering is unlikely to occur, and in the LL environment in which the temperature and humidity are lower than those in the NN environment. Accordingly, the reduction amounts ΔE (difference) of the primary transfer voltage in the normal mode M2 relative to the low-speed mode M1 can be set such that the NN environment (ΔE1)≥the HH environment (ΔE2)≥0 and the NN environment (ΔE1)≥the LL environment (ΔE3)≥0.

As stated above, it is possible to set the primary transfer voltage suitable for each environment by changing the reduction amount ΔE of the primary transfer voltage in the normal mode M2 relative to the low-speed mode M1, in accordance with the results of detection by the environment (temperature and humidity) sensors (the information acquisition unit S1).

In relation to the present exemplary embodiment, how to determine the primary transfer voltage in the three environments, the NN environment, the HH environment, and the LL environment has been described. Additionally, the reduction amount ΔE (difference) of the primary transfer voltage in the normal mode M2 relative to the low-speed mode M1 may also be changed in environments other than the foregoing three environments.

Next, an example of a table indicating a relationship among temperature, humidity (water content), and primary transfer voltage will be described with reference to FIG. 7. FIG. 7 is a table of primary transfer voltage (V) in the low-speed mode and normal mode of the image forming apparatus according to the second exemplary embodiment of the present disclosure.

Specifically, FIG. 7 illustrates a table of primary transfer voltage (V) corresponding to the temperature and water content (humidity). The table of primary transfer voltage (V) indicates the primary transfer voltage V1 (first voltage) in the low-speed mode M1 on the upper side and the primary transfer voltage V2 (second voltage) in the normal mode M2 on the lower side, with respect to the numerical values of water content.

As illustrated in FIG. 7, for the reduction amount (ΔE) in the normal mode M2 relative to the low-speed mode M1, ΔE1 is set to 8 V in environments close to the NN environment (at a temperature of 22° C. to 23° C. and with a water content of 9 g/m$^3$ to 10 g/m$^3$). On the other hand, ΔE3 or ΔE2 is set to 3 V in environments close to the LL environment or the HH environment (at a temperature of 15° C. to 16° C. and with a water content of 1 g/m$^3$ to 2 g/m$^3$ or at a temperature of 30° C. to 31° C. and with a water content of 24 g/m$^3$ to 25 g/m$^3$). In addition, ΔE is set to 6 V in other environments.

Since in the HH environment and the LL environment, the margin of the primary transfer voltage is larger with respect to toner scattering than in the NN environment, the reduction amount (difference) ΔE in the normal mode M2 relative to the low-speed mode M1 can be made smaller than in the NN environment.

In addition, in both the low-speed mode M1 and the normal mode M2, the primary transfer voltage can be determined by linear interpolation in the environments in which the temperature and the water content are within the range indicated in FIG. 7 (table), and can be determined by extrapolation in environments outside the table.

On the high-temperature H side and the high-humidity H side of FIG. 7 (table), the primary transfer voltage may not be continuously decreased in a linear manner but may be fixed to a value so as not to be less than a predetermined voltage. This is because transferability is more improved in a higher-temperature and higher-humidity HH environment, but the degree of improvement tends to be lower at a high temperature and a high humidity than in the NN environment.

As above, the primary transfer voltage may be set using a table so as to be suitable for each environment (humidity: L/N/H and temperature: L/N/H).

In the present exemplary embodiment, the primary transfer contrast is changed by changing the primary transfer voltage. However, the present disclosure is not limited to this configuration. The primary transfer contrast may be changed by changing the image forming potential V1 instead of changing the primary transfer voltage. Alternatively, the primary transfer contrast may be changed by changing both the primary transfer voltage and the image forming potential V1.

Figure 8:
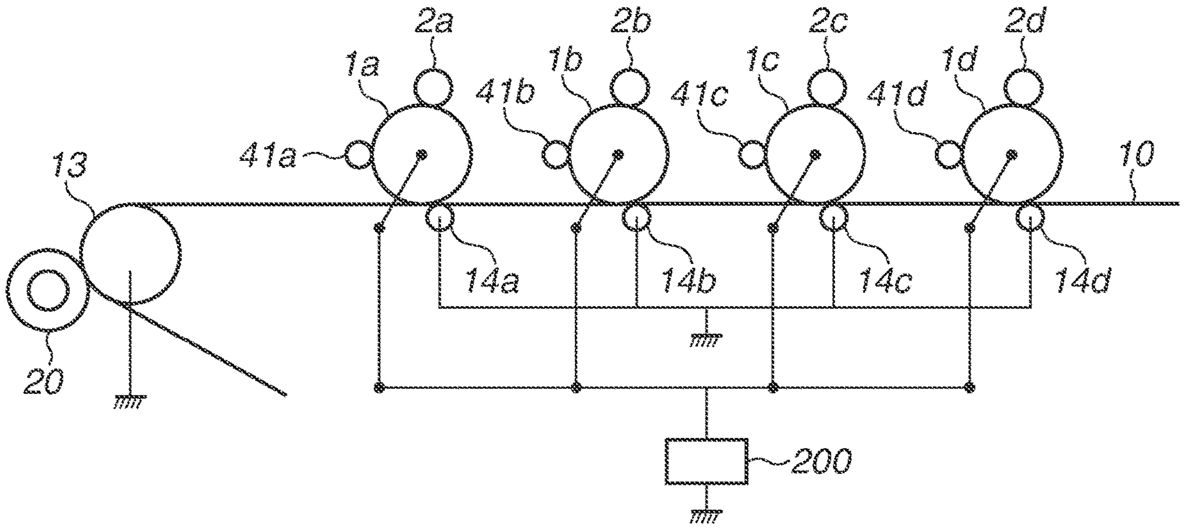
FIG. 8 is a conceptual cross-sectional view of a power source circuit in an image forming apparatus according to a third exemplary embodiment of the present disclosure.

In the above-described configurations of the first and second exemplary embodiments, the primary transfer contrast is changed by changing the primary transfer voltage. In contrast to this, in an image forming apparatus in a third exemplary embodiment, as illustrated in FIG. 8, a primary transfer voltage source is connected to ground so that a voltage is applied from a power source 200 to photosensitive drums 1*a* to 1*d* to control a primary transfer contrast. As described in detail below, even in a configuration without a primary transfer power source as in the present exemplary embodiment, it is possible to obtain advantageous effects similar to those of the configurations of the first and second exemplary embodiments. Hereinafter, only components different from those of the first exemplary embodiment will be described and description of the same components as those of the first exemplary embodiment will be omitted. In the following description, as in the description of the first exemplary embodiment, only a first image formation station Sa among four image formation stations will be taken as a representative except for configurations and controls of the four image formation stations that are different.

FIG. 8 is a schematic diagram illustrating a configuration of a power source around a primary transfer part in the image forming apparatus according to the third exemplary embodiment of the present disclosure. As illustrated in FIG. 8, a primary transfer roller 14*a* as a primary transfer member in the present exemplary embodiment is grounded and its potential is 0 V. On the other hand, a photosensitive drum 1*a* has a metal core (not illustrated) connected to the power source 200.

The image forming potential V1 is determined by the magnitudes of a reference potential of the photosensitive drum 1*a* and a charging bias applied to a charging roller 2*a*. More specifically, the image forming potential V1 is determined by controlling a charging contrast which is a difference between the reference potential of the photosensitive drum 1*a* and the charging bias. For example, if the photosensitive drum 1*a* is grounded and the reference potential is 0 V, it is necessary to change the value of the charging bias for control of the charging contrast in order to increase the absolute value of the image forming potential V1.

In the configuration of the present exemplary embodiment, the absolute value of the reference potential of the photosensitive drum 1*a* is changed to be greater than 0 V by applying a −350-V drum voltage from the power source 200 to the metal core of the photosensitive drum 1*a*. In this manner, applying a voltage (reference voltage) having the same polarity as the charging bias (that is, the same polarity as the normal charging polarity of the toner) makes it possible to form the image forming potential V1 greater than the absolute value of the reference voltage in the primary transfer part. As a result, the absolute value of the image forming potential V1 can be increased without changing the charging bias. Accordingly, it is possible to secure the difference between the primary transfer roller 14*a* grounded at a potential of 0 V and the image forming potential V1 (hereinafter, called primary transfer contrast ΔV), of a magnitude necessary for primary transfer.

Figure 9A:
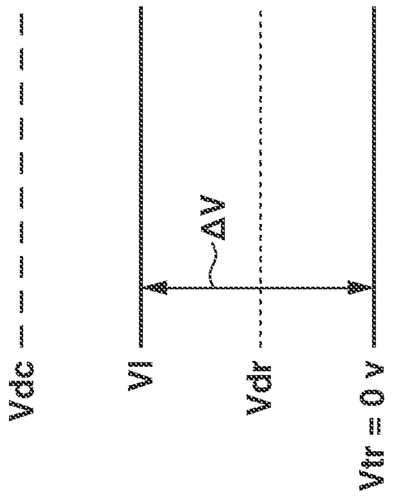
FIGS. 9A, 9B, and 9C are schematic diagrams describing primary transfer contrast control according to the third exemplary embodiment of the present disclosure.
Figure 9B:
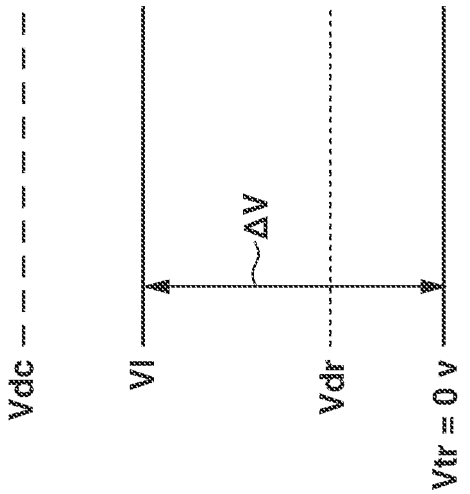
Figure 9C:
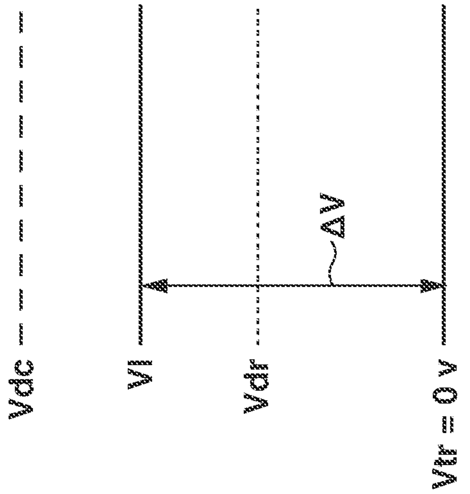

FIGS. 9A to 9C are schematic diagrams illustrating a relationship among the primary transfer voltage (0 v), a development roller voltage Vdc, a drum voltage Vdr, and the image forming potential V1 of a drum surface in the present exemplary embodiment. In FIGS. 9A to 9C, the lateral axis indicates the direction of scanning by an exposure device 3, and the vertical axis indicates the magnitude of the absolute value of each voltage (potential). FIG. 9A is a schematic diagram illustrating the primary transfer contrast ΔV in the configuration of the present exemplary embodiment. FIG. 9B is a schematic diagram illustrating a method for changing (increasing in this case) the primary transfer contrast ΔV in the configuration of the present exemplary embodiment. FIG. 9C is a schematic diagram illustrating another method for changing the primary transfer contrast ΔV in the configuration of the present exemplary embodiment.

First, FIG. 9A will be described. Since the primary transfer roller 14*a* is grounded, the potential of the primary transfer roller 14*a* is 0 V. In the state of FIG. 9A, a −350-V voltage is applied from the power source 200 to the metal core (not illustrated) of the photosensitive drum 1*a*, and the development roller voltage Vdc is set to −650 V, and the image forming potential V1 is set to −450 V. The development roller voltage Vdc and the image forming potential V1 are set with reference to the drum voltage Vdr. As illustrated in FIGS. 9A to 9C, their absolute values are both set to be greater than the drum voltage Vdr in the configuration of the present exemplary embodiment. The absolute value of the difference between the image forming potential V1 and the potential of the grounded primary transfer roller 14*a* constitutes the primary transfer contrast ΔV (Vtr−V1=450 V in the present exemplary embodiment). In this manner, by applying the drum voltage Vdr from the power source 200 to the photosensitive drum 1*a*, it is possible to make the absolute value of the image forming potential V1 greater than the reference voltage, thereby securing the primary transfer contrast ΔV necessary for primary transfer.

Then, FIG. 9B will be described. Referring to FIG. 9B, the primary transfer contrast ΔV is changed (increased) by changing the image forming potential V1 in the state of FIG. 9A, instead of changing the drum voltage Vdr. Specifically, the primary transfer contrast ΔV is increased by increasing the absolute value of the image forming potential V1. For example, the primary transfer contrast ΔV is changed to 550 V by changing the image forming potential V1 to −550 V with the drum voltage Vdr kept at −350 V. The image forming potential V1 can be changed by changing the amount of light exposure of the photosensitive drum 1*a* by the exposure unit 3*a*, or changing the charging bias to be applied to the charging roller 2*a*, or changing both. In the example of FIG. 9B, at the time of change of the image forming potential V1, the absolute value of the development roller voltage Vdc is increased along with the change in the image forming potential V1 (in the present exemplary embodiment, the development roller voltage Vdc is changed to −750 v). However, the present disclosure is not limited to this configuration, and may be configured not to change the development roller voltage Vdc.

As illustrated in FIG. 9C, the drum voltage Vdr and the image forming potential V1 may be both changed to change (increase) the absolute value of the primary transfer contrast ΔV from the state illustrated in FIG. 9A. That is, the primary transfer contrast ΔV may be changed to 550 V by, for example, changing the drum voltage Vdr to −450 V and changing the image forming potential V1 to −550 V. In this manner, the drum voltage Vdr may not be always fixed but may be changed as appropriate.

As above, in the configuration of the present exemplary embodiment, the primary transfer contrast ΔV can be generated and changed so that it is possible to use the intermediate transfer belt 10 through which an electric current can pass in the circumferential direction to primarily transfer a toner image from the photosensitive drum 1*a* onto the intermediate transfer belt 10. That is, even in the configuration of the present exemplary embodiment without the primary transfer power source 16, unlike in the first exemplary embodiment and the second exemplary embodiment, it is possible to perform control in a manner similar to the first exemplary embodiment and the second exemplary embodiment and obtain advantageous effects similar to those of the first exemplary embodiment and the second exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

an image bearing member configured to bear a developer image;

a rotatable endless intermediate transfer belt;

a transfer member configured to transfer the developer image from the image bearing member onto the intermediate transfer belt by applying an electric current to the intermediate transfer belt in a circumferential direction;

an information acquisition unit for acquiring environment information on surroundings of the image forming apparatus;

a power source configured to apply a transfer voltage to the transfer member; and a control unit configured to control the power source, wherein the control unit executes a first mode in which to rotate the intermediate transfer belt and a second mode in which to rotate the intermediate transfer belt at a rotation speed higher than that in the first mode, wherein the control unit performs control such that an absolute value of a second transfer voltage to be applied from the power source to the transfer member in a case of performing the primary transfer in the second mode is less than an absolute value of a first transfer voltage to be applied from the power source to the transfer member in a case of performing the primary transfer in the first mode, wherein the control unit controls the transfer voltage so that a voltage difference between the first transfer voltage and the second transfer voltage changes based on the environmental information and wherein in a case where the information acquisition unit detects the environment information indicating a higher temperature than a predetermined temperature or a higher humidity than a predetermined humidity, the control unit decreases the difference between the absolute values of the first voltage and the second voltage to be less than a difference between the absolute values of the first voltage and the second voltage in an environment at the predetermined temperature and the predetermined humidity.

2. The image forming apparatus according to claim 1, wherein the predetermined temperature is 17° C. to 28° C. and the predetermined humidity is 35% to 70%.

3. An image forming apparatus comprising:

an image bearing member configured to bear a developer image;

a rotatable endless intermediate transfer belt;

a transfer member configured to transfer the developer image from the image bearing member onto the intermediate transfer belt by applying an electric current to the intermediate transfer belt in a circumferential direction;

an information acquisition unit for acquiring environment information on surroundings of the image forming apparatus;

a power source configured to apply a transfer voltage to the transfer member; and a control unit configured to control the power source, wherein the control unit executes a first mode in which to rotate the intermediate transfer belt and a second mode in which to rotate the intermediate transfer belt at a rotation speed higher than that in the first mode, wherein the control unit performs control such that an absolute value of a second transfer voltage to be applied from the power source to the transfer member in a case of performing the primary transfer in the second mode is less than an absolute value of a first transfer voltage to be applied from the power source to the transfer member in a case of performing the primary transfer in the first mode, wherein the control unit controls the transfer voltage so that a voltage difference between the first transfer voltage and the second transfer voltage changes based on the environmental information, and wherein in a case where the information acquisition unit detects the environment information indicating a lower temperature than a predetermined temperature or a lower humidity than a predetermined humidity, the control unit decreases the difference between the absolute values of the first voltage and the second voltage to be less than a difference between the absolute values of the first voltage and the second voltage in an environment at the predetermined temperature and the predetermined humidity.

4. The image forming apparatus according to claim 3, wherein the predetermined temperature is 17° C. to 28° C. and the predetermined humidity is 35% to 70%.

5. The image forming apparatus according to claim 1, wherein a circumferential electric resistance of the intermediate transfer belt corresponding to a circumferential length of 100 mm is $1\times10^{9}\Omega$ or less.

6. The image forming apparatus according to claim 1, wherein the intermediate transfer belt has a plurality of layers in a thickness direction and an innermost layer along the thickness direction is a lower electric resistance than electric resistances of the other layers of the plurality of layers.

7. The image forming apparatus according to claim 1, wherein the control unit has a conversion table for converting color information of input image data into color information to be expressed in a plurality of color materials, and wherein a data value of the conversion table used for image formation in the first mode is larger than a data value of the conversion table used for image formation in the second mode.

* * * * *